United States Patent [19]

Lyon

[11] Patent Number: 5,512,789

[45] Date of Patent: Apr. 30, 1996

[54] ELECTRICALLY HEATED CATALYST CONTROL

[75] Inventor: Peter M. Lyon, Birmingham, Mich.

[73] Assignee: Ford Motor Company, Dearborn, Mich.

[21] Appl. No.: 270,973

[22] Filed: Jul. 5, 1994

[51] Int. Cl.$^6$ .................................................. F01N 3/10
[52] U.S. Cl. ........................... 307/10.1; 219/205; 60/300; 320/48
[58] Field of Search ..................... 60/300, 284; 307/9.1, 307/10.1, 117; 219/202, 205; 322/62–64; 340/455; 361/18, 21; 320/5, 39, 40, 48; 392/485, 491

[56] References Cited

U.S. PATENT DOCUMENTS

| 5,257,501 | 11/1993 | Wataya | 60/300 |
| 5,265,418 | 11/1993 | Smith  | 60/284 |
| 5,404,720 | 4/1995  | Laing  | 60/300 |

FOREIGN PATENT DOCUMENTS

| 40605037 | 2/1994 | Japan | 60/300 |
| 406081636 | 3/1994 | Japan | 60/300 |

Primary Examiner—William M. Shoop, Jr.
Assistant Examiner—Richard T. Elms
Attorney, Agent, or Firm—Peter Abolins; Roger L. May

[57] ABSTRACT

A control for electrically heated catalysts in a motor vehicle catalytic converter governs a switch for alternatively coupling an alternator output to the motor vehicle battery and a heating element of the catalytic converter. The control monitors electrical power delivered to the catalytic converter, preferably as a function of engine speed, field current and alternator output voltage, to infer actual temperature and compare it with the desired temperature at which the electrically heated catalyst is intended to operate. The control also preferably includes a field current adjuster to improve the power output to the catalytic converter when the switch couples the alternator output to the electrically heated catalyst. A switch actuator responsive to detection of the power delivered to the catalytic converter at a predetermined threshold actuates a switch to return the alternator to a charging connection with the vehicle battery. The power monitor also serves to adjust the field current delivered to the alternator to avoid the application of excessive charging voltage to the battery.

13 Claims, 3 Drawing Sheets

ELECTRICALLY HEATED CATALYST CONTROL

TECHNICAL FIELD

This invention relates generally to electrically heated catalysts for motor vehicles, and more particularly to a control for supplying voltage to electrically heat catalyst from an alternator.

BACKGROUND ART

Heated catalysts are used in motor vehicles to improve emission control by reducing hydrocarbon (HC) and carbon monoxide (CO) emissions. Typically, heat for this application is developed in the catalyst during cold start ups by means of an electrical heating element, whereby electrical energy supplied to the heating element brings the temperature of the catalyst up quickly to improve its effectiveness as soon as possible after the engine starts.

However, conventional electrically heated catalysts have several significant problems associated with them. If, electrical power is drawn from the motor vehicle battery, the power required to reach a useful temperature may subject the battery to severe treatment which can cause a substantial reduction in battery life. Furthermore, enhancement of the motor vehicle to include additional battery power incurs a significant weight increase and attendant fuel economy penalty due to the control system, wiring, and auxiliary battery which may be necessary to operate the electrically heated catalyst.

SUMMARY OF THE INVENTION

The present invention is a system for reducing emissions produced by an internal combustion engine of a motor vehicle by controlling an electrically heated catalyst. The system generally comprises a control relay for coupling the alternator to the electrically heated catalyst. The catalyst is disposed in a catalytic converter coupled in fluid communication with an exhaust conduit downstream of the engine. The catalyst is mounted proximate a substrate that heats the catalyst when electrical power is supplied to the substrate.

The control governs the relay to couple the alternator in selective electrical communication with the battery and with the substrate. Preferably, the relay comprises a normally closed switch to the battery, but a normally open switch couples the alternator to the substrate to supply power for heating after engine operation is initiated and the catalyst is not yet heated. The control also governs a voltage regulator that adjusts the field current to the alternator to increase the voltage output from the alternator when the switch connects the alternator to the electrically heated catalyst.

The control includes diagnostic monitoring of performance parameters, for example, simple current measurements. In the preferred embodiment, the control monitors the power consumption of the electrically heated catalyst so as to determine when the catalyst reaches a predetermined temperature desired for operation of the catalyst. In the preferred embodiment, the control avoids the difficulties associated with the use of transducers such as thermistors and other temperature sensors that are adversely affected by the cyclic operation of the current and temperature changes imposed upon such sensors. Accordingly, the control of the present invention preferably infers the temperature by monitoring the field current as the alternator output is applied to the electrically heated catalyst.

Accordingly, it is an object of the present invention to provide a system in which a switch coupling the alternator to an electrically heated catalyst is controlled in response to improved system diagnosis to supply the power required by the catalyst. In addition, the system reduces drainage of the vehicle battery charge while improving the power applied to an electrically heated catalyst. Another object of the present invention is to provide a system that allows the use of a simpler control system and smaller wires than conventional electrically heated catalyst systems. The present invention also controls an application of higher voltage to the catalyst than is typically output to the battery from the alternator.

The present invention also provides a control system that improves the ability of the alternator to efficiently heat an electrically heated catalyst by taking advantage of additional capacity available at the alternator to apply power to the electrically heated catalyst. In addition, the present invention permits automatic control for turning off the electrically heated catalyst at or around a predetermined temperature by monitoring the power delivered to the electrically heated catalyst. In addition, the present invention provides a system that prioritizes the battery charge for use in motor vehicle ignition, and limits catalyst heating that controls emissions to a more powerful electrical power source.

BEST MODE FOR CARRYING OUT THE INVENTION

Figure 1:
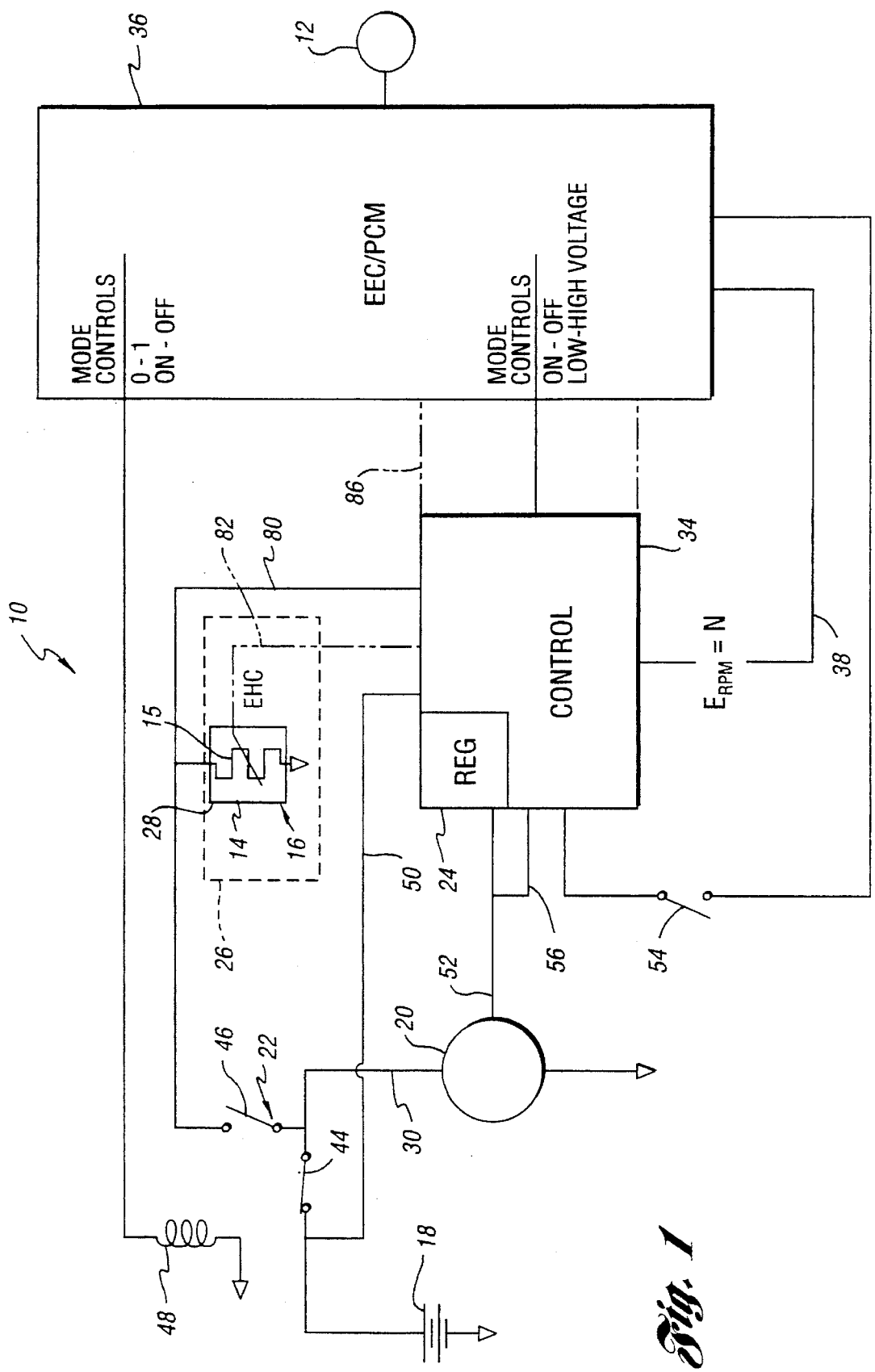
FIG. 1 is a schematic view of a system according to the present invention for powering an electrically heated catalyst from an alternator of a motor vehicle.

With reference to the drawing, the preferred embodiments of the present invention will be described. FIG. 1 shows a system 10 according to the present invention for reducing emissions produced by an internal combustion engine 12 such as is typically found in a motor vehicle. The system 10 comprises a catalyst 14 located in a two-way or three-way catalytic converter 16, a battery 18, a conventional alternator 20, switching means 22 operable in response to a control 24 such as a control relay 22, and an alternator voltage regulator 24.

The catalyst 14, which normally comprises an oxidizing catalyst such as platinum and/or palladium and/or a reducing catalyst such as rhodium, Monel and/or ruthenium, is disposed in the catalytic converter 16 downstream of the engine 12 in fluid communication with exhaust gases from the engine 12 such as through an exhaust pipe 26. A heating element 15, such as a resistor or series of resistors disposed in the catalytic converter 16 proximate the catalyst 14, preferably in a steel substrate 28 of the catalytic converter, functions as a means for heating the catalyst when electrical power is applied. Preferably, the substrate 28 has a resistance of about 0.5 ohms.

The battery 18 selectively powers the motor vehicle electrical systems, such as the starter motor, lights and radio of the vehicle. As is well known, the battery 18 solely provides electricity to these systems when the engine 12 is not running. After the engine is started up by closing ignition switch 54, the vehicle electrical systems are usually powered completely by electricity generated by the alternator 20, which in turn runs off the engine 12.

The alternator 20 is in selective electrical communication with the battery 18 and with the substrate 28 through an alternator output line 30. The output 30 is alternately coupled through the control relay 22 by a normally closed switch 44 to battery 18, and by a normally open switch 46 to the electrically heated catalyst 16. Before the engine 12 is started, and during normal vehicle operation, the switches 44 and 46 of control relay 22 are in their normal positions. The switches respond to a signal from an electronic engine control (EEC) or a powertrain control module (PCM) 36. Conventionally, these microprocessor based control modules generate a signal that connects the terminals of the switch 46 and open circuits the terminals of switch 44, when the electrically heated catalyst remains below a predetermined temperature after the engine 12 has started, to connect the alternator 20 in electrical communication with the substrate 28.

Immediately upon or within a second or two after the engine is started, the switch actuator 48 receives input from an electronic engine control module 36 on whether and for how long to energize the substrate 28. The amount of time that electrical energy needs to be supplied to the substrate 28 after start-up may be determined by reference to a look-up table stored in the control unit 34, and is related to the temperature of the catalyst 14 at start-up, which can be measured directly by a transducer as indicated diagrammatically at 82 in FIG. 1, or inferred from the engine coolant temperature or from some other parameter monitored by the PCM 36, and the elapsed time since last engine operation. For example, at box 60 in FIG. 2, if the engine coolant temperature is within a specified range and the time elapsed since last engine operation is greater than a specified time, the electronic engine control module 36 sends out a "turn-on" signal to the switch actuator 48 as demonstrated at box 62. When the switch actuator 48 receives the "turn-on" signal from the electronic engine control module 36, it switches the alternator output 30 from its connection with the vehicle battery 18 to the substrate 28.

The control unit 34 is in communication with the positive output terminal of the battery 18 through line 50 to sense the operating voltage of the battery. The control unit 34 also sends a field current signal 52 to the alternator that adjusts the output 30 from the alternator to the substrate 28. The control unit 34 also senses the field current at 56 to determine when the power fed to the converter 16 has reached a level deemed sufficient to heat the catalyst to a desired temperature level.

When the line 50 provides a signal at a voltage level below the alternator's normal charging level of about 14.5 volts to the battery's stand alone voltage of typically about 12.5 volts, the voltage regulator senses the initial drop below the normal charging level, indicating connection of the substrate 28 to the alternator output 30. The control unit 34 signals the regulator to output a higher or full field current at 52 so that the alternator generates an increased output 30, preferably of between about 15 and 70 volts, to the substrate 28 during heating as shown at 64 in FIG. 2. It should be appreciated that the functions of the electronic control unit 34 may be incorporated into the electronic engine control module 36, as indicated at 86 so that the latter performs all of the control functions. Nevertheless, the function may be segregated or consolidated as desired without departing from the scope of the present invention. However, FIG. 2 designates alternative separations between previous powertrain control module functions and the functions of new control module 34 for the sake of consistency with FIG. 1.

The exact voltage output 30 generated by the alternator 20 is a function of the speed at which the alternator 20 is running as shown diagrammatically at signal line 38 of an engine speed monitor providing signal N and the operating requirements of the system. For instance, while the vehicle transmission is not in gear, the PCM 36 increases the engine idle speed (rpm) to a higher level, until the transmission is shifted into gear. The higher level is sufficient to provide enough alternator output power to quickly heat up the catalyst 14. As an alternative to regulating the field current at 52, a two speed alternator, having a first relatively lower speed for battery charging and vehicle electrical supply and a second relatively higher speed for heating the catalyst when connected to the substrate 28, may be used.

Sufficient power is available from the alternator 20 when a higher field current 52 is output from the regulator to quickly heat the catalyst 14 to its desired operating temperature. Heating times preferably range from approximately from no heating in the case of an already hot engine to about 20–30 seconds for a cold engine. After a predetermined heating time has elapsed, or upon determining that the catalyst 14 has reached a sufficient operating temperature such as with a dedicated temperature sensor as diagrammatically indicated in phantom line at 82 in FIG. 1, or by otherwise inferring that such a temperature has been reached as according to the present invention, the PCM 36 sends out a turn-off signal to the actuator 48. At this time the engine rpms are lowered to their normal value if the transmission has not yet been shifted into gear.

While the alternator 20 is powering the substrate 28, the remainder of the vehicle electrical systems are powered by the vehicle battery 18. The alternator 20 remains connected to the substrate 28 until the actuator 48 receives the "turn-off" signal. Optionally, the control unit 34 can be adapted to continually monitor vehicle battery voltage at 50 to switch the alternator output back to the battery 18 in case the output voltage of the battery drops below a predetermined level, for instance to about 11 volts. To switch the power off to the substrate 28, the control unit 34 decreases the high level field current output at 52 to a lower regulated output level at 52 as the turn off signal to actuator 48 returns switches 44 and 46 to their normal positions to connect the alternator 20 to the vehicle battery 18. The control unit 34 also automatically monitors the alternator output voltage 30 at 80 to maintain a specified value to ensure that the catalyst 14 is not overheated.

By powering the substrate 28 from the vehicle alternator, preferably at a higher than normal voltage level from the alternator, the present invention eliminates the severe impact electrically heated catalysts have conventionally had on the battery. Also, the alternator provides a higher voltage, and correspondingly lower current, requirement for the power source for the catalytic converter that allows the use of a simpler control system and smaller connecting wires than conventional electrically heated catalysts.

Figure 2:
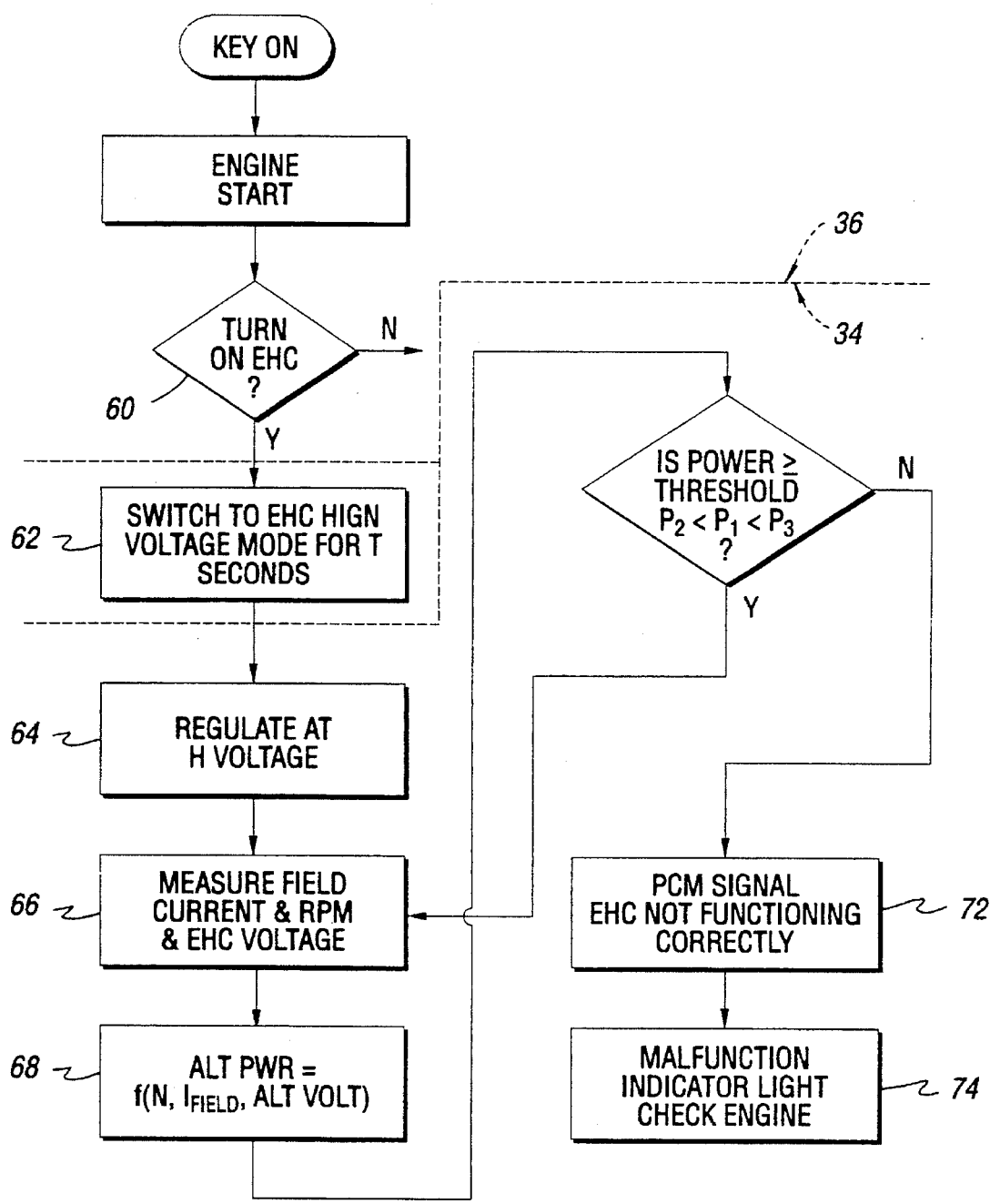
FIG. 2 is a flow chart of a preferred program for a portion of the control module shown in FIG. 1.

As shown at 66 in FIG. 2, the field current 52 is monitored at 56 (FIG. 1). This current sensing enables the control unit 34 to infer the temperature increase due to heat energy being delivered to the electrically heated catalyst by reference to the power fed into the electrically heated catalyst. This power is a function of the engine speed, the field current delivered to alternator 20, and the alternator voltage output 30 delivered to the electrically heated catalyst, as is demonstrated at 68 in FIG. 2. When the power delivered to the converter has reached a threshold level, the substrate of the catalyst will be deemed sufficiently heated to reach the critical temperature at which hydrocarbons and other emissions may be efficiently removed as they pass through the converter.

Figure 3:
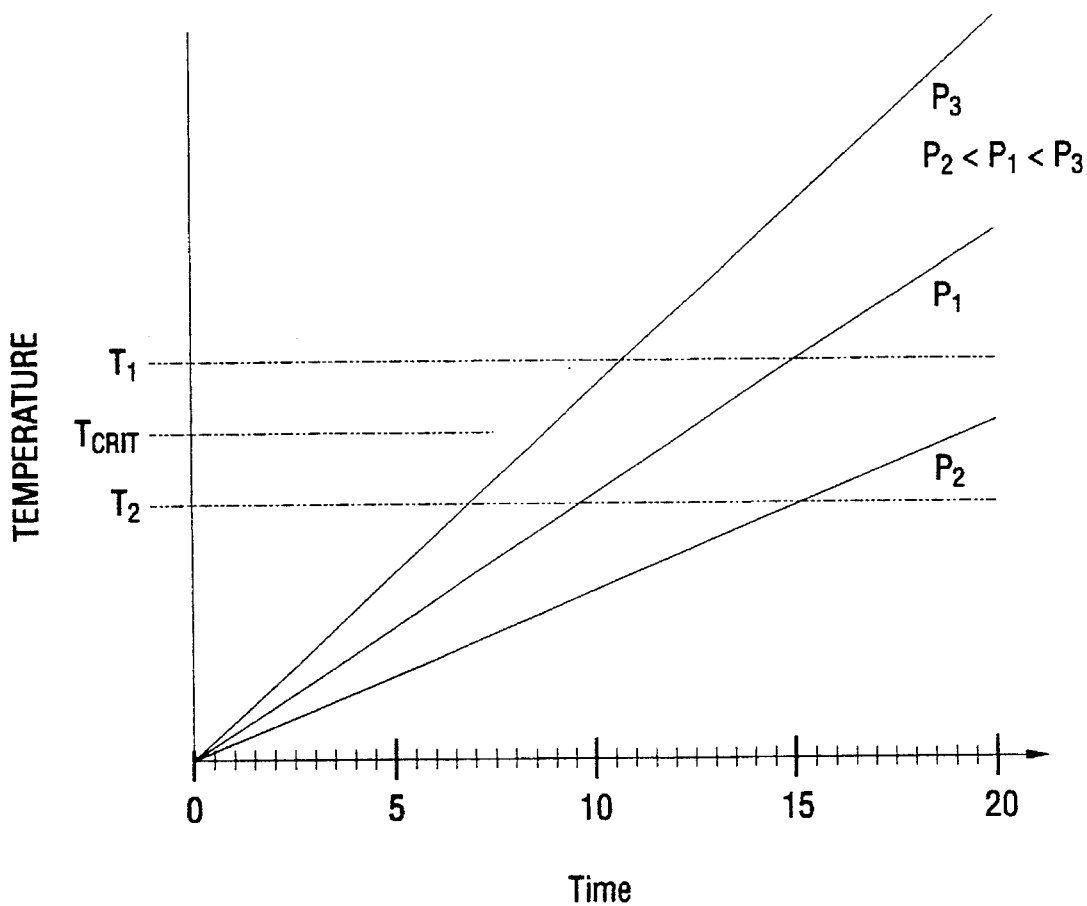
FIG. 3 is a graphic representation of the temperature inferring performance of the control module according to the present invention.

As best shown in FIG. 3, the critical temperature may be selected as a detected temperature determined within a particular range T2< T crit< T1. Moreover, if the power level detected at the control 34 is not between threshold power levels P2 and P3 or is not reached within a predetermined time duration, the control 34 conveys such information to the PCM 36 as designated at 72 in FIG. 2. Accordingly, a PCM 36 may generate an output which actuates an indicator such as a CHECK ENGINE indicator light to warn the vehicle operator of the need for checking the emission control system. Of course, this indicator is well known with engine control systems, and the indicator as shown at 74 may be responsive to numerous other emission control parameters being monitored by the PCM 36.

Thus the present invention provides an electrically heated catalyst system that can substantially shorten the time for heating the catalytic converter over previously known converter charging systems. Moreover, the control system reduces the damage to batteries which may otherwise be subject to damaging discharges upon connection with the resistors or substrate of the catalytic converter. In addition, the present invention takes advantage of the normally unused capacity of the alternator to produce substantially more power than is ordinarily required by the power demands of the charging the battery or otherwise operating the electrical systems of the vehicle. In addition, the present invention avoids the hardware requirements for temperature sensing that would be required to discontinue heating of the catalyst from previously known operating systems for heating the catalyst.

Another benefit of this invention is that by making the voltage regulator controlled by the electronic engine control module, the alternator may be regulated to increasingly higher voltages as the vehicle and catalyst age, in order to produce a relatively flat emission deterioration factor. Furthermore, if the power level that is required during low mileage operation is for some reason reduced, the present invention is capable of accommodating such a change, thereby improving the fuel economy of the vehicle and reducing the wear and tear on the system as a whole.

Having thus described a preferred embodiment of the present invention, many modifications will become apparent to those skilled in the art to which it pertains without departing from the scope and spirit of the present invention as defined in the appended claims.

I claim:

1. A control for electrically heating catalysts in a motor vehicle catalytic converter, the motor vehicle having a battery and an alternator with an output, the control comprising:

a switch for selectively coupling said alternator output to one of said electrically heated catalyst and said battery, a monitor for generating a power threshold signal when said electrically heated catalyst has received a threshold level of power, and wherein said switch is responsive to said power threshold signal to couple said alternator output to said battery.

2. The invention as defined in claim 1 wherein said control comprises a field current adjuster for increasing the field current to the alternator when said switch couples said alternator output to said electrically heated catalyst.

3. The invention as defined in claim 1 wherein said monitor comprises a field current monitor for detecting the field current delivered to said alternator.

4. The invention as defined in claim 1 wherein said monitor comprises an alternator output voltage monitor for detecting the output voltage from said alternator.

5. The invention as defined in claim 1 wherein said monitor comprises an engine speed monitor for detecting the speed at which the alternator is driven.

6. The invention as defined in claim 1 wherein said monitor comprises a field current monitor, an alternator output voltage monitor and an engine speed monitor.

7. The invention as defined in claim 6 wherein the motor vehicle includes an electronic engine control module having at least one of said field current monitor, said engine speed monitor and said alternator output voltage monitor.

8. The invention as defined in claim 1 wherein said catalytic converter includes a substrate electrically connectable to the alternator output and carrying said catalyst.

9. The invention as defined in claim 1 and further comprising a battery voltage monitor for generating a low battery signal in response to detection of a battery voltage level below a predetermined level and wherein said switch is responsive to said low battery signal for coupling the alternator output with the battery.

10. A control for an electrically heated catalyst for a motor vehicle catalytic converter, the motor vehicle having an alternator, a battery, and a catalytic converter, the control comprising:

a switch for coupling the motor vehicle alternator alternately to the electrically heated catalyst and the battery, a field current monitor generating a field current signal representative of field current delivered to the alternator, an engine speed monitor generating an engine speed signal representative of motor speed, an alternator output voltage monitor generating an alternator output voltage signal representative of the output voltage delivered through the switch from the alternator to the catalytic converter, a power monitor responsive to said engine speed signal, said alternator output voltage signal and said field current signal for inferring catalyst temperature as a function of a threshold electrical power level delivered to said electrically heated catalyst;

a switch actuator for coupling the alternator to the battery when the power monitor has sensed said threshold electrical power level.

11. A charging system for a motor vehicle having a battery and an electrically heated catalyst in a catalytic converter, the system comprising:

an alternator having an output for a voltage signal, a power control module having an alternator field current control with a regulator, said regulator having a first output level and a relatively higher second output level, a switch for coupling said alternator output to the battery and, alternatively, to the electrically heated catalyst, an actuator for alternatively actuating said switch to couple said alternator output to said electrically heated catalyst, wherein said power control module regulator delivers said first level of output when said switch couples said alternator output to said battery, and said power control module regulator delivers said second level of output to said alternator when said actuator has alternatively switched said alternator output to said catalyst.

12. The invention as defined in claim 11 wherein said power control module comprises a monitor for inferring the temperature of said catalyst by determining the power delivered to said catalytic converter, and releasing said actuator when the determined power level reaches a predetermined threshold value.

13. The invention as defined in claim 12 wherein said monitor comprises means for calculating power delivered to the catalytic converter as a function of alternator output voltage, alternator field current and engine speed.

* * * * *